(12) United States Patent
Shimizu et al.

(10) Patent No.: US 11,057,497 B2
(45) Date of Patent: *Jul. 6, 2021

(54) VEHICULAR MILLIMETER WAVE COMMUNICATION FOR NON-LINE OF SIGHT SCENARIOS

(71) Applicant: TOYOTA JIDOSHA KABUSHIKI KAISHA, Toyota (JP)

(72) Inventors: Takayuki Shimizu, Mountain View, CA (US); Vutha Va, Mountain View, CA (US); Gaurav Bansal, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,288

(22) Filed: Oct. 30, 2019

(65) Prior Publication Data

US 2020/0068044 A1 Feb. 27, 2020

Related U.S. Application Data

(63) Continuation of application No. 15/886,825, filed on Feb. 1, 2018, now Pat. No. 10,469,619.

(51) Int. Cl.
*G06F 15/16* (2006.01)
*H04L 29/08* (2006.01)
(Continued)

(52) U.S. Cl.
CPC .......... *H04L 67/327* (2013.01); *G08G 1/094* (2013.01); *H04W 4/46* (2018.02); *H04L 67/12* (2013.01); *H04W 84/18* (2013.01)

(58) Field of Classification Search
CPC ........ H04L 67/327; H04L 67/12; H04W 4/46; H04W 84/18; G08G 1/094
See application file for complete search history.

(56) References Cited

U.S. PATENT DOCUMENTS 8,469,122 B2 6/2013 Perlman et al.
10,098,014 B1 10/2018 Shimizu et al.
(Continued)

FOREIGN PATENT DOCUMENTS

JP PO2004-072268 3/2004
JP 2010157944 7/2010

OTHER PUBLICATIONS

USPTO, Notice of Allowance for U.S. Appl. No. 15/886,825, dated Jul. 1, 2019, 9 pages.
(Continued)

*Primary Examiner* — Philip B Tran
(74) *Attorney, Agent, or Firm* — Burbage Law, P.C.; Jon-Michael Burbage; Elizabeth Ruzich (57) ABSTRACT

The disclosure includes embodiments for performing beam alignment for non-line of sight (NLOS) scenarios. The method includes receiving, at a first vehicle, one or more wireless messages that include vehicle data, wherein the vehicle data describes a second vehicle position, a second vehicle speed, and a second vehicle heading. The method also includes determining sensor data. The method also includes determining an NLOS path based on the vehicle data and the sensor data so that the NLOS path avoids a potential blockage. The method also includes determining whether the NLOS path is predicted to succeed based on a beam transmission percentage satisfying a threshold percentage. The method also includes responsive to the NLOS path being predicted to succeed, performing beam alignment between the first vehicle and the second vehicle based on the NLOS path before the potential blockage is predicted to occur.

20 Claims, 6 Drawing Sheets

(51) Int. Cl.
*H04W 4/46* (2018.01)
*G08G 1/09* (2006.01)
*H04W 84/18* (2009.01)

(56) References Cited

U.S. PATENT DOCUMENTS

| | | | |
|---|---|---|---|
| 10,469,619 B2 * | 11/2019 | Shimizu | H04W 4/44 |
| 2010/0137006 A1 | 6/2010 | Rofougaran | |
| 2015/0092676 A1 | 4/2015 | Periyalwar et al. | |
| 2016/0345209 A1 | 11/2016 | Talukdar et al. | |
| 2017/0289864 A1 | 10/2017 | Narasimha et al. | |
| 2018/0194352 A1 * | 7/2018 | Avedisov | B60W 30/09 |
| 2018/0218607 A1 * | 8/2018 | Baghel | G08G 1/166 |
| 2018/0265084 A1 * | 9/2018 | Inou | G08G 1/16 |
| 2018/0288674 A1 | 10/2018 | Talukdar et al. | |
| 2019/0039610 A1 | 2/2019 | Mukai et al. | |
| 2019/0053296 A1 | 2/2019 | Balappanavar et al. | |
| 2019/0069208 A1 * | 2/2019 | Pefkianakis | H04W 36/30 |
| 2019/0213884 A1 * | 7/2019 | Kim | G01S 13/87 |

OTHER PUBLICATIONS

Toyota InfoTechnology Center, "Discussion on beam management for NR-V2X sidelink in millimeter-wave bands," 3G PP TSG RAN WG1 Meeting #94 R1-1809039, retrieved from Internet at http://www.3gpp.org/ftp/tsg_ran/WG1_RL1/TSGR1_94/Docs/R1-1809039.zip, Aug. 11, 2018, 7 pages.

JPO, Office Action (with English translation) for Japanese Patent Application No. 2019-015424, dated Dec. 3, 2019, 4 pages.

* cited by examiner

VEHICULAR MILLIMETER WAVE COMMUNICATION FOR NON-LINE OF SIGHT SCENARIOS

CROSS-REFERENCE TO RELATED APPLICATIONS

This patent application is a continuation of U.S. patent application Ser. No. 15/886,825, entitled VEHICULAR MILLIMETER WAVE COMMUNICATION FOR NON-LINE OF SIGHT SCENARIOS and filed on Feb. 1, 2018, the entirety of which is hereby incorporated by reference.

BACKGROUND

The specification relates to vehicular millimeter wave (mmWave) communication for non-line of sight (NLOS) scenarios.

Vehicles increasingly consume greater amounts of data. For example, vehicles may request high-definition three-dimensional maps, sensor data from other vehicles for autonomous vehicle purposes, streaming data for infotainment purposes, etc. The data may not be reasonably transmitted via conventional means, such as 3G connections, because the data may be too large to transmit or the transmission would be so demanding it would result in poor performance of the vehicle's equipment.

A mmWave message is a wireless message which is transmitted by a mmWave radio, i.e., via mmWave communication, on the band of spectrum between 30 gigahertz (GHz) and 300 GHz. Deploying mmWave communication in vehicles is desirable because mmWave communication is capable of providing gigabit (Gbts) per second data rates over short ranges. However, mmWave communication requires beam alignment between vehicles and current methods for beam alignment are designed for low mobility environments, such as when a stationary base station transmits the beam to another stationary device. This method cannot be applied to high mobility environments that occur when vehicles are moving.

In addition, mmWave communication between vehicles is frequently used in dynamic situations, such as when vehicles are travelling on a roadway. Because mmWave communication relies on transmission between antennas, transmission of mmWave communication between vehicles may be impeded by the presence of a blocker, such as a truck or a bus, because the blocker's height may be taller than the vehicles. Blockage causes a high propagation loss and makes it difficult to maintain a mmWave connection.

SUMMARY

Described herein is a method for vehicular mmWave communication for non-line of sight (NLOS) scenarios. A method includes receiving, at a first vehicle, one or more wireless messages that include vehicle data, wherein the vehicle data describes a second vehicle position, a second vehicle speed, and a second vehicle heading. The method also includes determining sensor data. The method also includes determining an NLOS path based on the vehicle data and the sensor data so that the NLOS path avoids a potential blockage. The method also includes determining whether the NLOS path is predicted to succeed based on a beam transmission percentage satisfying a threshold percentage. The method also includes responsive to the NLOS path being predicted to succeed, performing beam alignment between the first vehicle and the second vehicle based on the NLOS path before the potential blockage is predicted to occur. The method also includes transmitting a mmWave communication to the second vehicle.

In some embodiments, the method further includes generating a map that identifies objects in an environment between the first vehicle and the second vehicle and where determining the NLOS path includes performing ray tracing to determine the NLOS path between the first vehicle and the second vehicle. In some embodiments, the sensor data is used to identify the objects and surface materials of the objects as potential reflectors and the NLOS path includes reflecting a beam off of a reflector to avoid a blocker that creates the potential blockage. In some embodiments, the method further includes adapting a transmission scheme that includes at least one of modulation, error correction, and beam width adjustment based on a path length and a reflection loss of a beam when the beam is reflected. In some embodiments, responsive to the NLOS path being predicted to fail, the method further includes performing beam alignment between the first vehicle and the second vehicle based on a line-of sight (LOS) path. In some embodiments, the one or more wireless messages include at least one of a dedicated short range communication message (DSRC), a long-term evolution vehicle to everything (LTE-V2X) message, and a 802.11p message. In some embodiments, the one or more wireless messages are transmitted by at least one of the first vehicle, a blocker, and a roadside unit (RSU). In some embodiments, the one or more wireless messages include a wireless message received from a blocker, the vehicle data also describes a blocker position, a blocker speed, and a blocker heading, and determining whether the NLOS path is predicted to succeed is further based on the blocker position, the blocker speed, and the blocker heading. In some embodiments, determining the NLOS path based on the sensor data includes detecting surrounding objects and surface materials of the surrounding objects as potential reflectors of a beam.

A system can comprise an onboard vehicle computer of a vehicle that includes a non-transitory memory storing computer code, which, when executed by the onboard vehicle computer system causes the onboard vehicle computer system to: receive, at a first vehicle, one or more wireless messages that include vehicle data, wherein the vehicle data describes a second vehicle position, a second vehicle speed, and a second vehicle heading, determine sensor data, determine a non-line of sight (NLOS) path based on the vehicle data and the sensor data so that the NLOS path avoids a potential blockage, determine whether the NLOS path is predicted to succeed based on a beam transmission percentage satisfying a threshold percentage, responsive to the NLOS path being predicted to succeed, perform beam alignment between the first vehicle and the second vehicle based on the NLOS path before the potential blockage is predicted to occur, and transmit a mmWave communication to the second vehicle.

In some embodiments, the onboard vehicle computer system includes additional computer code that causes the onboard vehicle computer system to: generate a map that identifies objects in an environment between the first vehicle and the second vehicle and where determining the NLOS path includes performing ray tracing to determine the NLOS path between the first vehicle and the second vehicle. In some embodiments, the sensor data is used to identify the objects and surface materials of the objects as potential reflectors and the NLOS path includes reflecting a beam off of a reflector to avoid a blocker that creates the potential blockage. In some embodiments, the onboard vehicle computer system includes additional computer code that causes the onboard vehicle computer system to: adapt a transmission scheme that includes at least one of modulation, error correction, and beam width adjustment based on a path length and a reflection loss of the beam when the beam is reflected. In some embodiments, the onboard vehicle computer system includes additional computer code that causes the onboard vehicle computer system to: responsive to the NLOS path being predicted to fail, performing beam alignment between the first vehicle and the second vehicle based on a line-of sight (LOS) path.

One general aspect includes a non-transitory memory encoded with a computer program, the computer program comprising instructions that, when executed by one or more processors, cause the one or more processors to perform operations comprising receiving, at a roadside unit (RSU), one or more wireless messages from a vehicle that include vehicular data, where the vehicle data describes a vehicle position, a vehicle speed, and a vehicle heading, determining sensor data, generating a map from the vehicle data and the sensor data that includes objects and corresponding reflectivity of surface materials of the objects, determining a non-line of sight (NLOS) path based on the map so that the NLOS path avoids a potential blockage, determining whether the NLOS path is predicted to succeed, and responsive to the NLOS path being predicted to succeed, performing beam alignment between the RSU and the vehicle based on the NLOS path before the potential blockage is predicted to occur.

In some embodiments, the NLOS path is predicted to succeed based on a beam transmission percentage satisfying a threshold percentage and the threshold percentage corresponds to a transmission rate of a line-of sight (LOS) path. In some embodiments, determining the NLOS path includes performing ray tracing to determine the NLOS path between the RSU and the vehicle. In some embodiments, the NLOS path includes reflecting a beam off of a reflector to avoid a blocker that creates the potential blockage. In some embodiments, the operations further comprise: adapting a transmission scheme that includes at least one of modulation, error correction, and beam width adjustment based on a path length and a reflection loss of a beam when the beam is reflected. In some embodiments, the operations further comprise: responsive to the NLOS path being predicted to fail, performing beam alignment between the RSU and the vehicle based on a line-of sight (LOS) path.

The specification describes performing beam alignment based on an NLOS path for vehicular mmWave communication that advantageously describes a way to accurately communicate between vehicles without suffering degradation of the mmWave communication from blockages. As a result, the mmWave communication results in safer, efficient, and proactive driving because it is possible to share sensor data among different vehicles. In addition, the vehicles can receive an updated global high-definition three-dimensional (HD 3D) map. Furthermore, a HD 3D map for the entire country does not have to be stored on a vehicle because the vehicle can continue to receive portions of the HD 3D map via mmWave communication. Lastly, the mmWave communication may provide for additional vehicular content, such as streaming services for infotainment purposes.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example Overview

A first vehicle may determine sensor data. For example, the sensor data may be generated by a sensor set that includes a camera, light detection and ranging (LIDAR), radar, etc. The first vehicle receives one or more wireless messages that include vehicle data. The wireless messages may include at least one of a dedicated short range communication message (DSRC), a long-term evolution vehicle to everything (LTE-V2X) message, and a 802.11p message. The vehicle data describes a second vehicle position, a second vehicle speed, and a second vehicle heading.

The first vehicle determines that there is a blocker causing a blockage between the first vehicle and an intended recipient, such as a second vehicle, of the millimeter wave (mmWave) communication. A blocker is an object (e.g., other cars, buildings, etc.) or roadway feature (e.g., topography or roadway structures) that prevents a clear line of sight between the first vehicle and the intended recipient. A blocker may be avoided by designing a non-line of sight (NLOS) path that goes around the blocker, for example, by reflecting the beam off of an object, such as a building.

The first vehicle determines the NLOS path based on the sensor data and the vehicle data that avoids the blocker. For example, the first vehicle generates a map that identifies objects in an environment between the first vehicle and the intended recipient. The first vehicle determines whether the NLOS path is predicted to succeed based on a beam transmission percentage satisfying a threshold percentage. For example, the NLOS path is predicted to succeed if 70% of the beams are transmitted to the second vehicle. If the NLOS path is predicted to succeed, beam alignment is performed between the first vehicle and the second vehicle based on the NLOS path. If the NLOS path is predicted to fail, beam alignment is performed between the first vehicle and the second vehicle based on a line-of sight (LOS) path. Once beam alignment is established, a mmWave communication is transmitted to the second vehicle.

Example System

Figure 1:
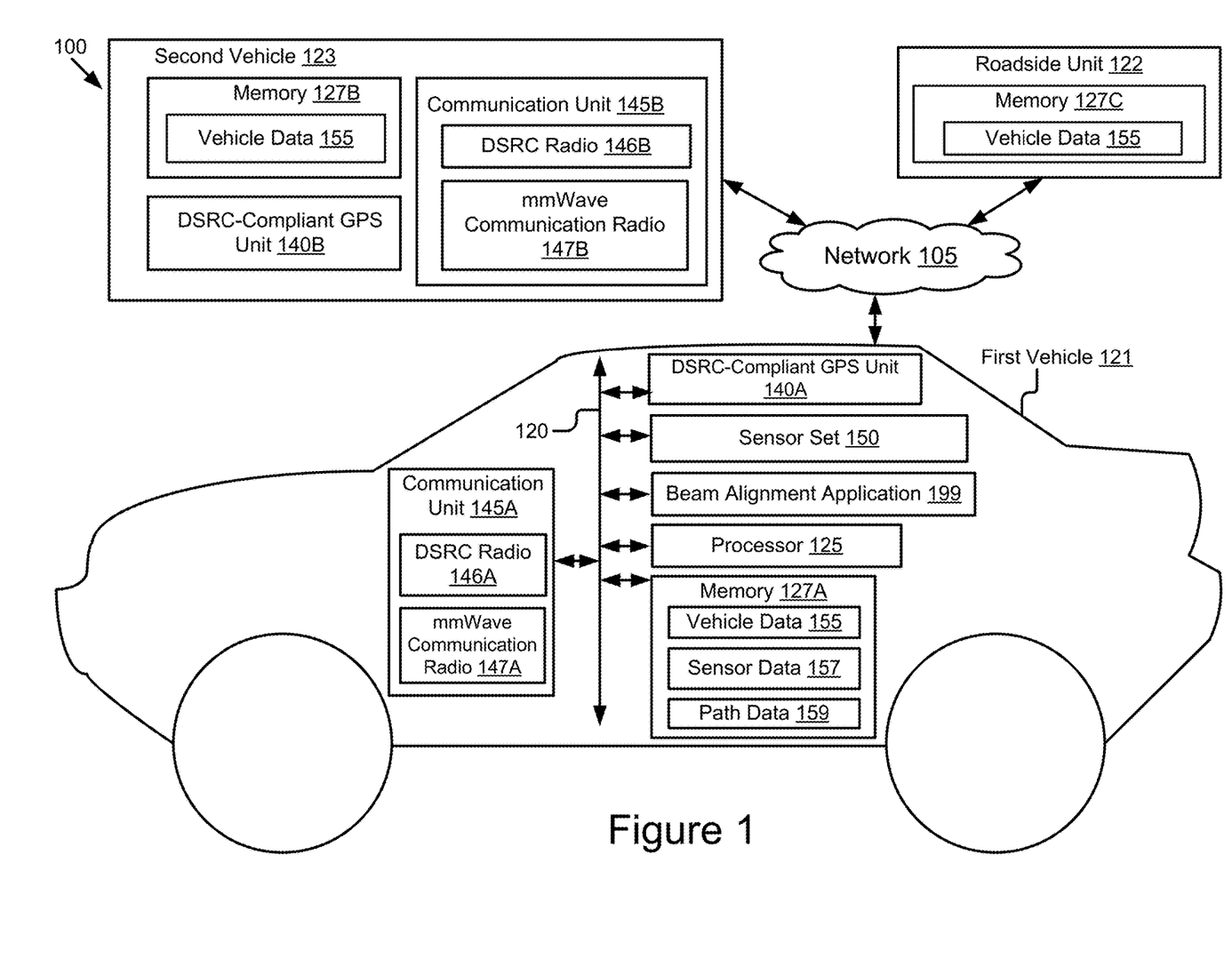
FIG. 1 is a block diagram illustrating an operating environment for a beam alignment application according to some embodiments.

Referring to FIG. 1, is an operating environment 100 for a beam alignment application 199 according to some embodiments. As depicted, the operating environment 100 includes the following elements: a first vehicle 121, a RSU 122, and a second vehicle 123. These elements are communicatively coupled to one another by a network 105.

Although one first vehicle 121, one RSU 122, one second vehicle 123, and one network 105 are depicted in FIG. 1, in practice the operating environment 100 may include one or more first vehicles 121, one or more RSUs 122, one or more second vehicles 123, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, millimeter wave (mmWave), WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks. The IEEE 802.11 standard also includes the 802.11p amendment to the IEEE 802.11 standard, which adds wireless access in vehicular environments to the IEEE 802.11 standard.

The first vehicle 121 is any type of vehicle with an onboard vehicle computer that is enabled for mmWave communication and wireless messaging, such as DSRC messages, LTE-V2X messages, and/or 802.11p messages. For example, the first vehicle 121 is one of the following types of vehicles: a car; a truck; a sports utility vehicle; a bus; a semi-truck; a drone; or any other roadway-based conveyance. A mmWave message is a wireless message which is transmitted by a mmWave radio, i.e., via mmWave communication, on the band of spectrum between 30 gigahertz (GHz) and 300 GHz.

The first vehicle 121 may include a processor 125, a memory 127A, a DSRC-compliant GPS unit 140A, a communication unit 145A, a sensor set 150, and a beam alignment application 199. Each of the elements communicate via a bus 120.

In FIG. 1 and the remaining figures, a letter after a reference number represents a reference to the element having that particular reference number. For example, 127A refers to the memory on the first vehicle 121 and 127B refers to the memory on the second vehicle 123. A reference number in the text without a following letter represents a general reference to embodiments of the element bearing that reference number. For example, 127 refers to memory in general.

Figure 2:
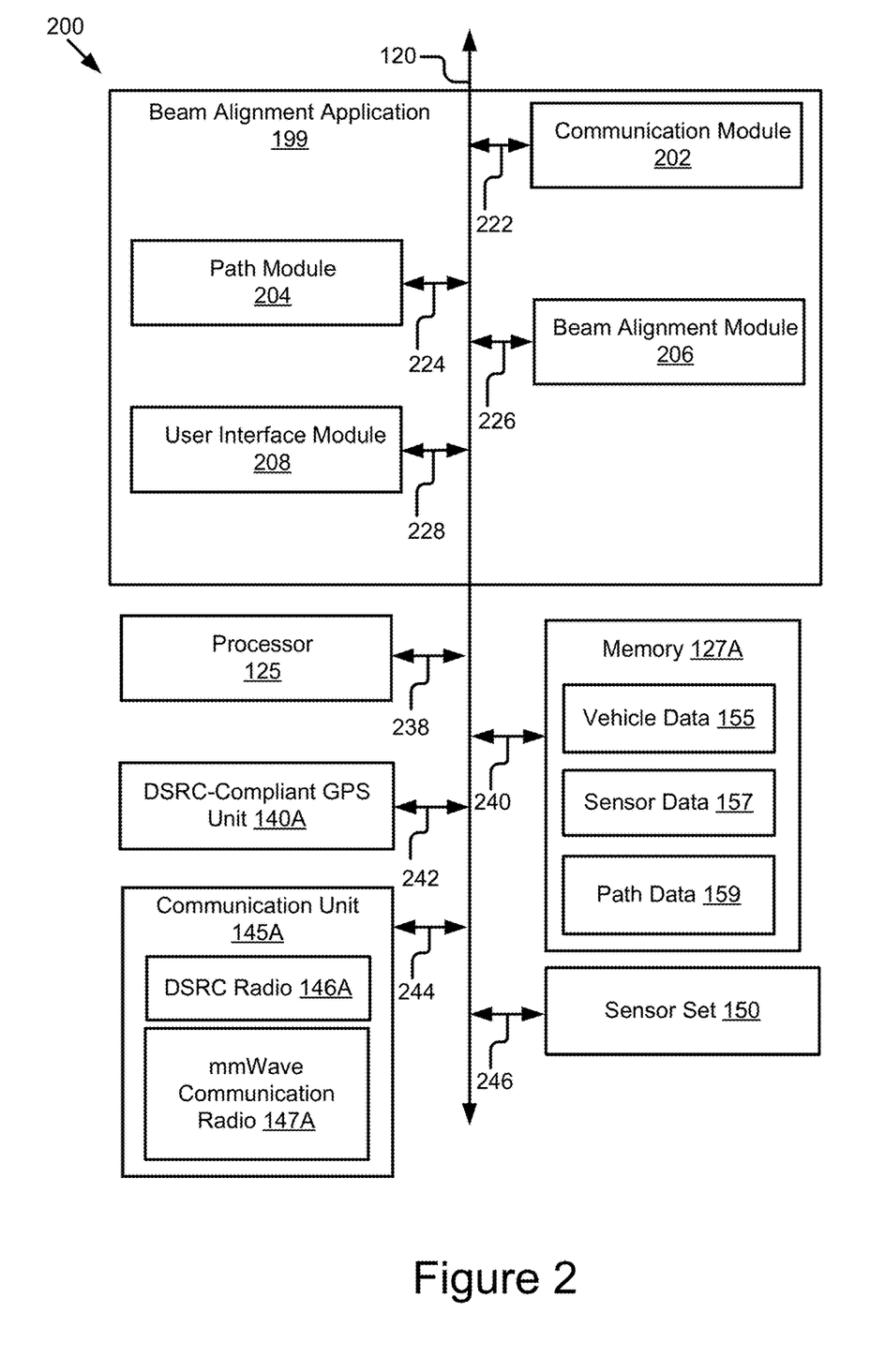
FIG. 2 is a block diagram illustrating an example computer system that includes a beam alignment application according to some embodiments.

In some embodiments, the processor 125 and the memory 127A may be elements of an onboard unit. The onboard unit includes an electronic control unit (herein "ECU") or an onboard vehicle computer system that may be operable to cause or control the operation of the beam alignment application 199. The onboard unit may be operable to access and execute the data stored on the memory 127A to provide the functionality described herein for the beam alignment application 199 or its elements. The onboard unit may be operable to execute the beam alignment application 199 which causes the onboard unit to execute one or more of the steps of the method 700 described below with reference to FIG. 7 or the method 800 described below with reference to FIG. 8. In some embodiments, the computer system 200 depicted in FIG. 2 is an example of an onboard unit.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first vehicle 121 may include one or more processors 125. Other processors, operating systems, sensors, displays, and physical configurations may be possible.

The memory 127A is a non-transitory memory that stores instructions or data that may accessed and executed by the processor 125. The instructions or data may include code for performing the techniques described herein. The memory 127A may be a dynamic random access memory (DRAM) device, a static random access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127A may be reserved for use as a buffer or virtual random access memory (virtual RAM). The first vehicle 121 may include one or more memories 127A.

The memory 127A of the first vehicle 121 stores one or more of the following types of digital data: vehicle data 155; sensor data 157; and path data 159. In some embodiments, the memory 127A stores any data that is necessary for the beam alignment application 199 to provide its functionality. For example, the memory 127A may store historical data about beam alignment.

The vehicle data 155 is digital data that describes a vehicle position, a vehicle speed, and a vehicle heading. The vehicle data 155 may be generated by a DSRC-compliant GPS unit 140B of the second vehicle 123, a DSRC-compliant GPS unit 140A of the first vehicle 121, vehicles that send their vehicle data 155 to the RSU 122, a blocker, etc. The DSRC-compliant GPS unit 140A may generate the vehicle data 155 periodically, such as every 100 msec. The vehicle data 155 may include additional data, such as a unique identifier associated with a corresponding vehicle, journey data that describes an intended journey of a vehicle, historical data describing a historical journey of a vehicle, etc. The communication unit 145A may transmit the vehicle data 155 associated with the first vehicle 121 periodically to the network 105 and periodically receive vehicle data 155 from the second vehicle 123 and/or the RSU 122.

The sensor data 157 is digital data that describes data generated by a sensor set 150 of the first vehicle 121, the second vehicle 123, and/or other vehicles. For example, the sensor data 157 may include images from external cameras and internal cameras, LIDAR measurements, radar measurements, measurements from advanced driver assistance systems (ADAS), etc. The sensor data 157 may describe the surrounding of the vehicle such that the beam alignment application 199 can use the sensor data 157 to create a map of the objects surrounding the vehicles.

The path data 159 is digital data that describes paths between the first vehicle 121 and the second vehicle 123. The path data 159 may include both a path and an associated success rate of the path. For example, the path data 159 may include a NLOS path that avoids a blocker through the use of one or more reflectors and a 78% success rate that indicates that there is only a 22% loss of signal. The path data 159 may also include a LOS path where many of the beams are blocked by a blocker and a 30% success rate that indicates a 70% signal loss. The path data 159 may also include information about the beam transmission, such as a particular wavelength within the mmWave spectrum that the first vehicle 121 uses.

In some embodiments, the second vehicle 123 does not include a conventional global positioning system unit ("GPS unit"), and instead includes a DSRC-compliant GPS unit 140A. A conventional GPS unit provides positional information that describes a position of the conventional GPS unit with an accuracy of plus or minus 10 meters of the actual position of the conventional GPS unit. By comparison, a DSRC-compliant GPS unit 140A provides GPS data that describes a position of the DSRC-compliant GPS unit 140A with an accuracy of plus or minus 1.5 meters of the actual position of the DSRC-compliant GPS unit 140A. This degree of accuracy is referred to as "lane-level accuracy" since, for example, a vehicle lane is generally about 3.7 meters wide, and an accuracy of plus or minus 1.5 meters is sufficient to identify which lane a vehicle is travelling in among other vehicle lanes. In some embodiments, a DSRC-compliant GPS unit 140A is operable to identify, monitor and track its two-dimensional position within 1.5 meters of its actual position 68% of the time under an open sky.

In some embodiments, the DSRC-compliant GPS unit 140A is operable to provide the vehicle data 155 describing the location of the first vehicle 121 with lane-level accuracy. For example, the first vehicle 121 is driving on a four-lane highway. Lane-level accuracy means that the location of the first vehicle 121 is described by the vehicle data 155 so accurately that the first vehicle's 121 position in the third of the four lanes may be accurately determined based on the vehicle data 155 for this first vehicle 121 as provided by the DSRC-compliant GPS unit 140A.

In some embodiments, the DSRC-compliant GPS unit 140A includes any hardware and software necessary to make the second vehicle 123 or the DSRC-compliant GPS unit 140A compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); and EN 13372:2004 Dedicated Short-Range Communication—DSRC profiles for RTTT applications (review); EN ISO 14906:2004 Electronic Fee Collection—Application interface. In some embodiments, the DSRC-compliant GPS unit 140A includes hardware that wirelessly communicates with a GPS satellite to retrieve vehicle data 155 that describes the geographic location of the second vehicle 123 with a precision that is compliant with the DSRC standard. The DSRC standard requires that vehicle data 155 be precise enough to infer if two vehicles (one of which is, for example, second vehicle 123) are located in adjacent lanes. In some embodiments, the DSRC-compliant GPS unit 140A is operable to identify, monitor, and track its two-dimensional position within 1.5 meters of its actual position 68% of the time under an open sky. Since traffic lanes are typically 3.7 meters wide, whenever the two-dimensional error of the vehicle data 155 is less than 1.5 meters, the vehicle data 155 may be analyzed to determine what lane the second vehicle 123 is travelling in based on the relative positions of two or more travelling vehicles (one of which is, for example, second vehicle 123) in multiple lanes at the same time.

The communication unit 145A transmits and receives data to and from the network 105 or to another communication channel. For example, the communication unit 145A transmits the vehicle data 155 to the network 105, which sends it to the RSU 122 and/or the second vehicle 123. In some embodiments, the communication unit 145A may include a DSRC radio 146, a mmWave communication radio 147, and other hardware or software necessary to make the first vehicle 121 a DSRC-equipped device and a mmWave communication equipped vehicle.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, Bluetooth®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); EN 13372: 2004 Dedicated Short-Range Communication—DSRC profiles for RTTT applications (review); the communication method described in U.S. patent application Ser. No. 14/471,387 filed on Aug. 28, 2014 and entitled "Full-Duplex Coordination System"; or another suitable wireless communication method. In some embodiments, the communication unit 145A includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes a DSRC radio 146A. The DSRC radio 146A is a hardware unit that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 146A includes a non-transitory memory which stores digital data that controls the frequency for broadcasting DSRC messages. In some embodiments, the non-transitory memory stores a buffered version of the vehicle data 155 discussed below for the first vehicle 121 so that the vehicle data 155 for the first vehicle 121 is broadcast as an element of the DSRC messages which are regularly broadcast by the DSRC radio 146A.

In some embodiments, the DSRC radio 146A includes any hardware or software which is necessary to make the first vehicle 121 compliant with the DSRC standards. In some embodiments, the DSRC-compliant GPS unit 140A is an element of the DSRC radio 146.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication—DSRC Data link layer: Medium Access and Logical Link Control (review); EN 12834:2002 Dedicated Short-Range Communication—Application layer (review); and EN 13372:2004 Dedicated Short-Range Communication—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz.

The DSRC messages are communicated using a vehicular-adapted wireless messaging protocol. One type of DSRC message is known as a Basic Safety Message ("BSM" if singular or "BSMs" if plural). A BSM includes BSM data. The BSM data describes attributes of the vehicle. For example, the BSM may include two parts.

Part 1 of the BSM data contains core data elements and is transmitted at an adjustable rate of about 10 times per second. Part 1 of the BSM data may describe one or more of the following: (1) GPS data describing a position of the vehicle; (2) motion data for the vehicle; and (3) a path history of the vehicle. The position of the vehicle may include latitude, longitude, elevation, positional accuracy, and a time associated with the position. The motion of the vehicle may include a transmission state, a speed of the vehicle, a heading of the vehicle, a steering wheel angle of the vehicle, a four-way acceleration set for the vehicle that includes three axes of acceleration plus yaw rate, and a brake system status. In some embodiments, part 1 may also include vehicle size.

Part 2 of the BSM data may include a variable set of data elements drawn from a list of optional elements. The list of optional elements may include a path history, a path prediction, information about hard active braking, information about a traction control system when it is active over 100 msec, information about an antilock brake system when it is active over 100 msec, a status of lights that are changed, a status of exterior lights, information about a change of the wipers, a status of the wipers, and vehicle type. Some of the BSM data included in Part 2 of the BSM are selected based on event triggers, e.g., anti-locking brake system ("ABS") being activated may trigger BSM data relevant to the ABS system of the vehicle. In some embodiments, the selected data elements are added to part 1 and sent as part of the BSM, but are transmitted less frequently in order to conserve bandwidth. In some embodiments, part 2 also includes current snapshots, with the exception of path data, which is itself limited to a few seconds worth of past history data.

The BSM may be broadcast at a bandwidth between 5.850 and 5.925 gigahertz. The transmission range of the BSM may be as large as 1,000 meters. DSRC-enabled vehicles broadcast a BSM at a regular interval, which is referred to below as a "time frame." In some embodiments, a radar interference management system is programmed with a default time frame value, for example, 0.01 seconds. The time frame may be user adjustable. In some embodiments, the BSM is broadcast at an adjustable rate of once every 0.10 seconds.

In some embodiments, the communication unit 145A of the first vehicle 121 includes one or more mmWave communication radios 147A. The mmWave communication radio 147A includes a transceiver for transmitting a mmWave communication and a receiver for receiving a mmWave communication. The mmWave communication transceiver transmits mmWave messages to the network 105, which is received by the second vehicle 123. The mmWave communication receiver receives mmWave messages from the second vehicle 123 via the network 105. In this way, the first vehicle 121 and the second vehicle 123 transmit mmWave messages to one another. In some embodiments, the mmWave communication radio 147A includes transceivers and receivers on the front and rear bumpers and sides for communication with the second vehicle 123 and other vehicles, and a transceiver and a receiver on the rooftop for communication with infrastructure, such as the RSU 122.

The sensor set 150 may include one or more devices that provide sensor data 157 about a vehicle operation. For example, the sensor set 150 may include one or more sensors that detect a presence of objects that surround the vehicle 123. The sensor set 150 may be communicatively coupled to an onboard computer of a vehicle so that the sensor data 157 may be stored in the memory 127A and accessible by the beam alignment application 199.

The sensors included in the sensor set 150 may include one or more external sensors such as one or more of the following: a camera or camera array mounted to the exterior of the first vehicle 121, a microphone; a moisture sensor, a thermometer; an altimeter; an accelerometer; a WiFi sniffer; a Bluetooth antenna; a LIDAR camera; a humidistat; an infrared camera, etc.

The sensor set 150 may include an infrared detector, a motion detector, a thermostat, etc. Alternatively or additionally, the sensor set 150 may include a component or module of another system or device included in the first vehicle 121 (e.g., radio, infotainment system, air conditioner, windshield wipers, systems for repositioning vehicle occupant seats, systems for changing the level of vehicle windows, vehicle headlights, vehicle cabin lights, etc.) that reports a status of the system or device to the onboard computer of the first vehicle 121 where it may be monitored or controlled by other elements of the first vehicle 121.

Accordingly, the sensor set 150 may provide sensor data describing one or more of the following: a temperature inside the vehicle; a temperature outside the vehicle; a position of the seats; a radio station; an audio program; a window level; a level of illumination of vehicle headlights or cabin lights, a speed of windshield wipers, and other parameters or settings associated with the vehicle and/or any system, subsystem, or device included in or communicatively coupled to the vehicle.

In some implementations, the sensor set 150 may include sensors for measuring one or more of a current time, a location (e.g., a latitude, longitude, and altitude of a location), an acceleration of the vehicle 123, a velocity of the vehicle 123, a fuel tank level of the vehicle 123, a battery level of the vehicle 123, etc.

In some embodiments, the beam alignment application 199 includes code and routines that are operable, when executed by the processor 125, to cause the processor 125 to execute one or more of the steps of the method 700 described below with reference to FIG. 7 and/or the method 800 described below with reference to FIG. 8. For example, the beam alignment application 199 may use the vehicle data 155 and the sensor data 157 to determine a NLOS path and determine whether the NLOS path is predicted to succeed. If the NLOS path is predicted to success, the beam alignment application 199 may perform beam alignment based on the NLOS path. If the NLOS path is predicted to fail, the beam alignment application 199 may perform beam alignment based on a LOS path. Once beam alignment is complete, the beam alignment application instructs the mmWave communication radio 147A to perform mmWave communication.

In some embodiments, the beam alignment application 199 of the first vehicle 121 may be implemented using hardware including a field-programmable gate array ("FPGA") or an application-specific integrated circuit ("ASIC"). In some other embodiments, the beam alignment application 199 may be implemented using a combination of hardware and software.

Embodiments of the beam alignment application 199 are described in more detail below with reference to FIGS. 2-8.

The second vehicle 123 is any type of vehicle with an onboard vehicle computer that is enabled for mmWave communication and wireless messaging, such as DSRC messages, LTE-V2X messages, and/or 802.11p message. For example, the second vehicle 123 is one of the following types of vehicles: a car; a truck; a sports utility vehicle; a bus; a semi-truck; a drone; or any other roadway-based conveyance. In some embodiments, the second vehicle 123 includes the following elements: a memory 127B; a DSRC-compliant GPS unit 140B; and a communication unit 145B.

The DSRC-compliant GPS unit 140B is similar to the DSRC-compliant GPS unit 140A described above with reference to the first vehicle 121, and so, will not be described here. The communication unit 145B is similar to the communication unit 145A described above with reference to the first vehicle 121, and so, will not be described here. The DSRC radio 146B and the mmWave communication radio 146B are similar to the DSRC radio 146A and the mmWave communication radio 146A, respectively, as described above, and so, will not be described here.

The second vehicle 123 may generate vehicle data 155 and transmit the vehicle data 155 via a wireless message to the first vehicle 121. The vehicle data 155 may help the beam alignment application 199 of the first vehicle 121 to determine how to perform beam alignment based on the position, speed, and heading of the second vehicle 123. Once the beam alignment is complete, the second vehicle 123 may send data to the second vehicle 123 such as sensor data 157.

The RSU 122 may be a stationary device that communications with vehicles within a particular geographic area. For example, the RSU 122 may transmit DSRC messages, which typically have a maximum range of about 1,000 meters. The RSU 122 may include a memory 127C that includes vehicle data 155 received from the second vehicle 123 via the network 105. The RSU 122 may transmit the vehicle data 155 to the network 105, which transmits the vehicle data 155 to the first vehicle 121. The RSU 122 may include a communication unit (not illustrated) with a DSRC radio (not illustrated) for transmitting the vehicle data 155 as a DSRC message. In some embodiments, the RSU 122 may transmit the vehicle data 155 as a wireless message, such as a LTE-V2X message or an 802.11p message. In some embodiments, the RSU 122 receives vehicle data 155 from multiple vehicles and aggregates the vehicle data 155. The RSU 122 may transmit the aggregated vehicle data to the first vehicle 121 via the network 105. In some embodiments, the RSU 122 includes a mmWave radio (not illustrated) for sending mmWave communications to the first vehicle 121 and/or the second vehicle 123.

Example Computer System

Referring now to FIG. 2, depicted is a block diagram illustrating an example computer system 200 including the beam alignment application 199 of the first vehicle 121 of FIG. 1 according to some embodiments.

In some embodiments, the computer system 200 may include a special-purpose computer system that is programmed to perform one or more steps of a method 700 described below with reference to FIG. 7 and/or a method 800 described below with reference to FIG. 8.

In some embodiments, the computer system 200 is an onboard vehicle computer of the first vehicle 121. In some embodiments, the computer system 200 is an onboard unit of the first vehicle 121 of FIG. 1. In some embodiments, the computer system 200 is an ECU, head unit, or some other processor-based computing device of the first vehicle 121 of FIG. 1.

The computer system 200 may include one or more of the following elements according to some examples: the beam alignment application 199; the processor 125; the memory 127A; the DSRC-compliant GPS unit 140A; the communication unit 145A; and the sensor set 150. Other elements are not illustrated, but may be included, such as an onboard radar system, an autonomous driver assisted system (ADAS systems), etc. The components of the computer system 200 are communicatively coupled by a bus 120.

In the illustrated embodiment, the processor 125 is communicatively coupled to the bus 120 via signal line 238. The memory 127A is communicatively coupled to the bus 120 via signal line 240. The DSRC-compliant GPS unit 140A is communicatively coupled to the bus 120 via signal line 242. The communication unit 145A is communicatively coupled to the bus 120 via signal line 244. The sensor set 150 is communicatively coupled to the bus 120 via signal line 246.

The following elements of the computer system 200 were described above with reference to FIG. 1, and so, those descriptions will not be repeated here: the processor 125; the memory 127A; the DSRC-compliant GPS unit 140A; the communication unit 145A; the DSRC radio 146A; the mmWave communication radio 147A; and the sensor set 150.

The memory 127A may store any of the data described above with reference to FIG. 1. The memory 127A may also store any data needed for the computer system 200 to provide its functionality.

As illustrated, the memory 127A stores: the vehicle data 155; the sensor data 157; and the path data 159. These elements were described above with reference to FIG. 1, and so, their descriptions will not be repeated here. The memory 127A may also store data received as a mmWave communication, such as a HD-3D map, sensor data from other vehicles, infotainment data, etc.

The beam alignment application 199, as described in greater detail below, determines how to perform beam alignment for mmWave communications. In the illustrated embodiment shown in FIG. 2, the beam alignment application 199 includes a communication module 202, a path module 204, a beam alignment module 206, and a user interface module 208.

The communication module 202 can be software including routines for handling communications between the beam alignment application 199 and other components of the computer system 200 or one or more of the operating environment 100 of FIG. 1. In some embodiments, the communication module 202 can be a set of instructions executable by the processor 125 to provide the functionality described below for handling communications between the beam alignment application 199 and other components of the computer system 200. In some embodiments, the communication module 202 can be stored in the memory 127A of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145A, to and from one or more elements of the operating environment 100. In some embodiments, the communication module 202 receives or transmits, via the communication unit 145A, wireless messages from the second vehicle 123, the RSU 122, or other vehicles, such as blockers. For example, the communication module 202 receives a wireless message that includes vehicle data 155 that describes a vehicle position, a vehicle speed, and a vehicle heading. The communication module 202 may store the vehicle data 155 in the memory 127A from the first vehicle 121 and/or the RSU 122. The communication module 202 may index the vehicle data 155 according to a unique identifier associated with vehicle data 155 from each vehicle such that the vehicle data 155 is organized based on the vehicle. The communication module 202 may send or receive any of the data described above with reference to FIG. 1, or below with reference to FIGS. 7 and 8, via the communication unit 145A.

In some embodiments, the communication module 202 receives data from components of the beam alignment application 199 and stores the data in the memory 127A (or a buffer or cache of the memory 127A). For example, the communication module 202 receives vehicle data 155 from the DSRC-compliant GPS unit 140A and sensor data 157 from the sensor set 150 and stores the vehicle data 155 and the sensor data 157 in the memory 127A (or a buffer or cache of the memory 127A). The communication module 202 may also instruct the communication unit 145A to transmit the vehicle data 155 to the second vehicle 123 and/or the RSU 122.

In another example, the communication module 202 may instruct the mmWave communication radio 147A to transmit or receive data. For example, the communication module 202 may instruct the mmWave communication radio 147A to transmit sensor data 157 to the RSU 122 or receive HD-3D map data from the RSU 122. Additional examples of mmWave communications are discussed below with reference to FIG. 3.

In some embodiments, the communication module 202 may handle communications between components of the beam alignment application 199. For example, the communication module 202 transmits path data 159 generated by the path module 204 to the beam alignment module 206.

The path module 204 can be software including routines for determining how to perform beam alignment. In some embodiments, the path module 204 can be a set of instructions executable by the processor 125 which, when executed by the processor 125, cause the processor 125 to execute one or more of the steps of the method 700 described below with reference to FIG. 7 and/or the method 800 described below with reference to FIG. 8. In some embodiments, the path module 204 can be stored in the memory 127A of the computer system 200 and can be accessible and executable by the processor 125. The path module 204 may be adapted for cooperation and communication with the processor 125 and other components of the computer system 200 via signal line 224.

The path module 204 receives vehicle data 155 from the communication module 202 or retrieves the vehicle data 155 from the memory 127A. In some embodiments, the path module 204 receives vehicle data 155 about the first vehicle 121 from the communication module 202, for example, after the vehicle data 155 is generated by the DSRC-compliant GPS unit 140A. The path module 204 determines the vehicle data 155 by identifying vehicles associated with a position, a speed, and a heading. In some embodiments, the path module 204 receives vehicle data 155 that describes a blocker position, a blocker speed, and a blocker heading.

The path module 204 receives sensor data 157 from the sensor set 150 via the communication module 202 or by retrieving the sensor data 157 from the memory 127A. The path module 204 may also receive a wireless message that includes sensor data 157 from the first vehicle 121, the RSU 122, and or a blocker via the communication module 202 or by retrieving the sensor data 157 from the memory 127A. The path module 204 determines sensor data 157 by identifying objects from the sensor data 157 and determining information associated with the objects, such as their position and the reflectivity of the surfaces of the objects.

The path module 204 may generate a map that identifies objects in an environment between the first vehicle 121 and the second vehicle 123. In some embodiments the path module 204 translates the vehicle data 155 and the sensor data 157 into a common format and uses an aggregation of the vehicle data 155 and the sensor data 157 to generate a point cloud of the environment between the first vehicle 121 and the second vehicle 123. The map may also include a reflectivity of the surfaces of each of the objects in the environment.

In some embodiments, the path module 204 uses the vehicle data 155 to determine the location of the first vehicle 121, the second vehicle 123, and any blockers as a function of time. The path module 204 uses the vehicle data 155 to determine both the location of vehicles at a current time and in the future. For example, if the first vehicle 121 is at (x, y, z) location at time t and a different location at time t+1, the path module 204 uses the first vehicle's 121 future position to determine how to perform beam alignment with the second vehicle 123. The path module 204 may generate the map as a function of time to show the location of the vehicles as time changes.

The path module 204 may use sensor data 157 to determine the environment. For example, the sensor set 150 may include LIDAR data. LIDAR fires laser beams at objects that surround it to produce a spherical view of the environment. The LIDAR data may include time of flight technology to measure how far away objects are based on how long it takes the beams to bounce back. The path module 204 may perform a similar process using radar and other sensors from the sensor set 150. For example, the sensor set 150 may include short-range sensors, long range sensors, short-range blind-spot sensors, forward vision sensors, and rear vision sensors. The sensor data 157 may also include data generated by ADAS systems, such as precrash, parking aid, blind spot detection, backup parking aid, rear crash collision, lane change assistant, blind spot detection, collision mitigation, collision warning, and stop and go for adaptive cruise control, etc.

In some embodiments, the path module 204 uses the sensor data 157 to determine whether surrounding objects have surface areas that are good for reflecting beams. For example, tinted glass may be more reflective than clear glass, brick, concrete, and drywall. Some materials for objects may be disadvantageous for reflecting beams because the material is absorbent of the beams. As a result, the beams may suffer penetration loss, which diminishes the amount of signal that is received by another vehicle. The path module 204 may determine a reflection coefficient for each object that is part of the map. The path module 204 may determine reflection and penetration measurements for surrounding objects. For example, the path module 204 may determine that an object is made of tinted glass and has a reflection coefficient of 0.896.

The path module 204 determines a NLOS path based on the sensor data 157 and the vehicle data 155 that avoids a potential blockage before the potential blockage is predicted to occur. For example, the path module 204 determine a map of objects in the environment between the first vehicle 121 and a second vehicle 123. The path module 204 identifies the surface materials of the objects and determines which objects are potential reflectors. For example, the path module 204 identifies that objects with high reflection coefficients make idea reflectors. The NLOS path may include reflecting a beam off of a reflector to avoid a blocker that creates the potential blockage. The path module 204 may determine the NLOS path by performing ray tracing to determine the NLOS path between the first vehicle 121 and the second vehicle 123.

Figure 3:
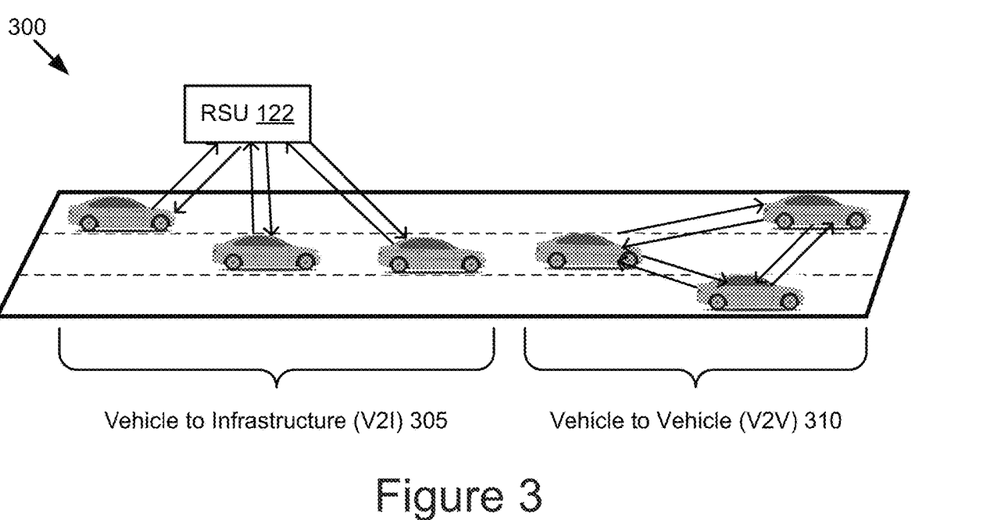
FIG. 3 is a block diagram illustrating example scenarios where mmWave communication occurs via vehicle to infrastructure millimeter wave (mmWave) communications or vehicle to vehicle mmWave communication according to some embodiments.

Turning to FIG. 3, a block diagram 300 illustrates example scenarios where mmWave communication occurs via vehicle to infrastructure 305 mmWave communications or vehicle to vehicle 310 mmWave communication. Large amounts of data may not be reasonably transmitted by conventional means, such as 3G, 4G, WiFi, or DSRC, because the data may be too large to transmit or the transmission would result in poor performance of the vehicle equipment. As a result, mmWave communications are an advantageous way to transmit the data. The vehicles may use vehicle to infrastructure 305 mmWave communications to share sensor data generated by each vehicle with the RSU 122 and/or HD-3D maps with the RSU 122. In some embodiments, the vehicles may perform vehicle to vehicle 310 mmWave communications. For example, the first vehicle 121 may transmit sensor data 157 generated by the sensor set 150 to the second vehicle 123 using mmWave communications.

Transmission and reception of sensor data and HD-3D maps is advantageous for the first vehicle 121. For example, the sensor data 157 may be used to expand sensor coverage for determining more accurate NLOS paths. In this way, the process may be iterative such that the path module 204 determines a NLOS path that is implemented by the beam alignment module 206 for transmitting mmWave communications. The vehicle 123 may then receive mmWave communications with sensor data 157 from other vehicles that the path module 204 uses to determine a more accurate NLOS path. As a result, each time the NLOS path is determined, the NLOS path may be more accurate because it is enhanced with the additional sensor data 157.

In another example, the sensor data 157 may be transmitted to a cloud server and used to generate the HD-3D maps. As a result, the HD-3D maps are kept up-to-date with the continual sensor data. The vehicles 121, 123 may then receive portions of the HD-3D maps on demand. For example, the first vehicle 121 may transmit the first vehicle's 123 location to the RSU 122 and receive a mmWave communication from the RSU 122 that includes a portion of the HD-3D map that corresponds to the first vehicle's 123 location. The first vehicle 121 may transmit the first vehicle's 123 location periodically, each time the first vehicle 121 enters a new city, etc. The first vehicle 121 may receive the HD-3D map periodically, each time the first vehicle 121 enters a new city, etc. This advantageously reduces a need for the first vehicle 121 to store a large amount of data.

The use of mmWave communication is advantageous for transmitting large amounts of data. However, mmWave communication is most efficiently achieved when narrow beams are used instead of broad spectrum beams. This is because a broader usage of mmWave bands results in high propagation loss and reduced communication range with a broad beam in mmWave communications. Another source of propagation loss is through the use of reflecting beams off of objects. Because some objects absorb beams more than others, the propagation loss may be so great that a line-of sight (LOS) path would result in more mmWave communications reaching the second vehicle 123 than if the NLOS path was used. As a result, the path module 204 may determine whether the NLOS path is predicted to succeed and use the NLOS path if the NLOS path is predicted to be successful.

In some embodiments, the path module 204 determines that the NLOS path is predicted to be successful based on a beam transmission percentage satisfying a threshold percentage. The threshold percentage may represent a percentage of signal that is predicted to be reached by the second vehicle 123. For example, the path data 159 may include a threshold percentage of 80%. If the NLOS path is predicted to result in a loss of 21% of signal, the path module 204 may determine to use a LOS path because the percentage of signal that is predicted to be reached would be 79%, which fails to satisfy the threshold percentage of 80%.

In another example, the threshold percentage may be based on the predicted signal loss that would result by using a LOS path. For example, the path module 204 may determine that a LOS path would result in 60% of the signal reaching the second vehicle 123. As a result, the path module 204 may determine to use a NLOS path only if it results in greater than 60% of the signal reaching the second vehicle 123.

If the NLOS path is predicted to succeed, the path module 204 may determine to perform beam alignment between the first vehicle 121 and the second vehicle 123 based on the NLOS path. The path module 204 may determine parameters for beam alignment using the NLOS path and transmit the parameters to the beam alignment module 206 via the communication module 202.

If the NLOS path is predicted to fail, the path module 204 may determine to perform beam alignment between the first vehicle 121 and the second vehicle 123 based on a LOS path. The path module 204 may determine parameters for beam alignment using the LOS path and transmit the parameters to the beam alignment module 206 via the communication module 202.

Figure 4:
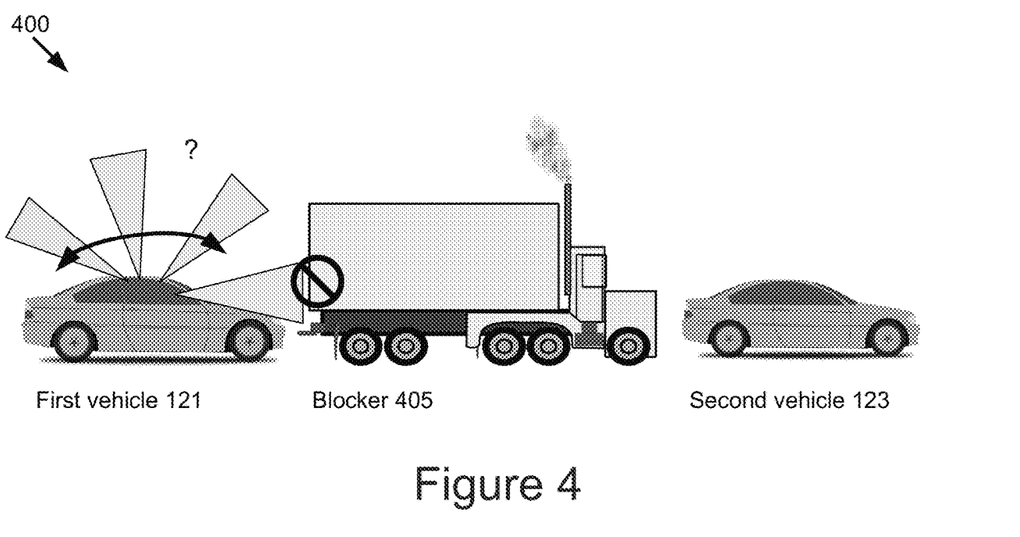
FIG. 4 is a block diagram illustrating the problem of using mmWave communication when a blocker is present according to some embodiments.

FIG. 4 illustrates why a blockage is problematic during mmWave communications. FIG. 4 is a block diagram 400 illustrating the problem of using mmWave communication when a blocker is present according to some embodiments. In this example, the blocker 405 is a truck with a height that prevents mmWave communications between the first vehicle 121 and the second vehicle 123. Although a first vehicle 121 and a second vehicle 123 are illustrated, a RSU 122 may communicate with the first vehicle 121 and/or the second vehicle 123.

The blockage may occur due to a combination of (1) a low antenna height on either the first vehicle 121 and/or the second vehicle 123 and (2) a high mobility of the vehicle 121/RSU 122 and/or the first vehicle 121. Although some of the beams may reach the second vehicle 123, the blockage may cause a high propagation loss of a minimum of 7-20 dB, which makes it difficult to maintain a mmWave connection sufficient to implement mmWave communications.

Figure 5:
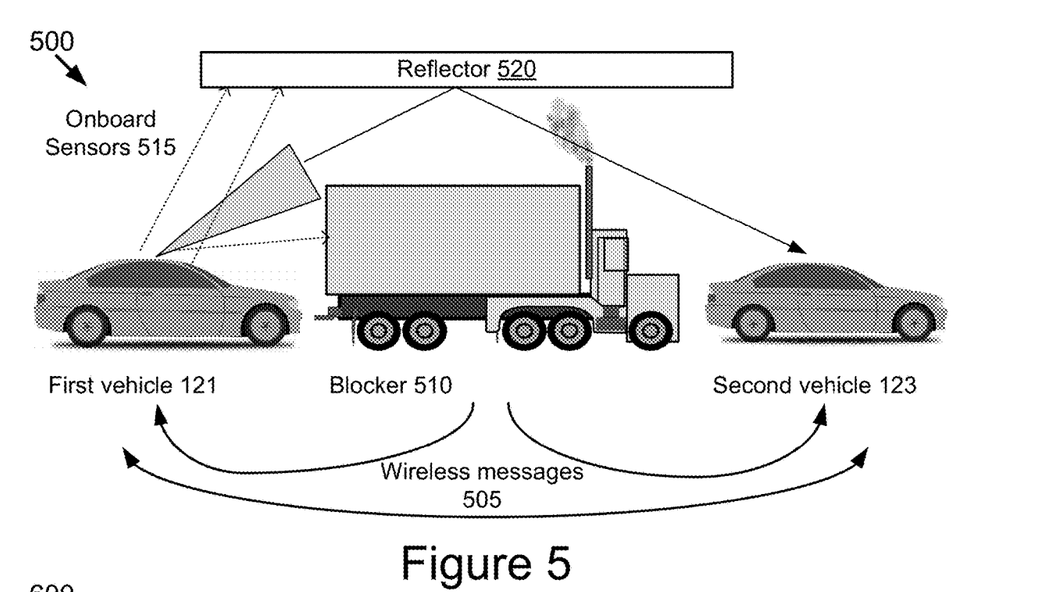
FIG. 5 is a block diagram illustrating how wireless messages are used to identify a blocker and avoid the blocker by using a reflector as part of a non-line of sight (NLOS) path according to some embodiments.

In some embodiments, the path module 204 determines whether a blockage is predicted to occur based on wireless messages from the first vehicle 121 and from the blocker 510. For example, the blocker 510 may be equipped with a DSRC-compliant GPS unit 140B and may provide blocker vehicle data 155 to the first vehicle 121, which the path module 204 combines with the vehicle data 155 and the sensor data 157 to determine whether a blockage would occur at the time the beam is intended to be transmitted.

The problem of a blockage that interferes with mmWave communications may be resolved by transmitting wireless messages to determine the position, speed, and heading of the vehicles to avoid the blockage. Turning to FIG. 5, a block diagram 500 illustrates how wireless messages 505 are used to identify a blocker 510 and avoid the blocker 510 by using a reflector 520 as part of a non-line of sight (NLOS) path. In this example, the first vehicle 121 receives wireless messages 505 from both the second vehicle 123 and the blocker 510. The path module 204 of the first vehicle 121 may receive sensor data 157 from the second vehicle 123 and/or the blocker 510 that describe the geographic landscape surrounding the vehicles.

The first vehicle 121 also includes onboard sensors 515 and determines sensor data 157 from the onboard sensors 515. For example, the sensor data 157 may include information about objects in the environment and the reflectivity of each of the objects. FIG. 5 illustrates the signals from the onboard sensors 515 with dashed lines to show how the onboard sensors detect the distance between the first vehicle 121 and the blocker 510; and the first vehicle 121 and the reflector 520. The onboard sensors 515 also provide information about the reflectivity of the reflector 520 by determining what percentage of a signal from the first vehicle 121 to the reflector 520 is returned back to the first vehicle 121.

The path module 204 determines an NLOS path for avoiding the blocker 510 by using the reflector 520 to reflect the beam to the second vehicle 123 and, as a result, completely avoid the blocker 510. For example, the path module 204 uses the sensor data 157 and the vehicle data 155 to generate a map of objects and their corresponding reflectivity to determine the best reflectors for reflecting the beam. If the path module 204 determines that the NLOS path is predicted to be successful, the path module 204 determines to perform beam alignment using the NLOS path.

Figure 6:
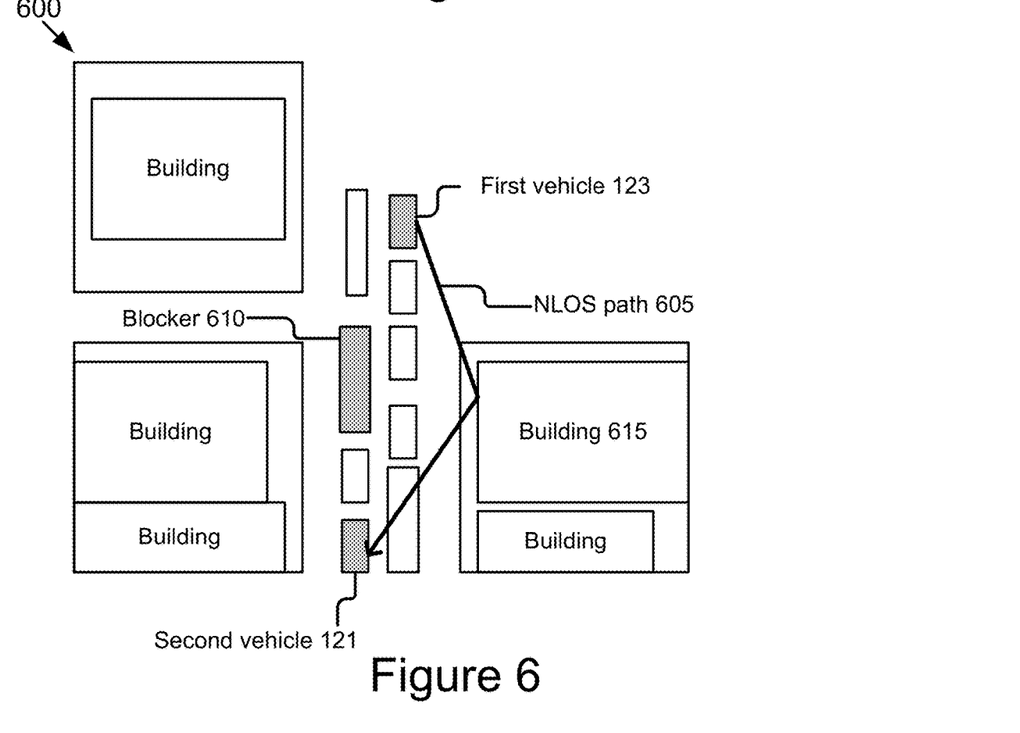
FIG. 6 is a block diagram illustrating a NLOS path for avoiding a blocker according to some embodiments.

FIG. 6 is a block diagram 600 illustrating a NLOS path 605 for avoiding a blocker 610 according to some embodiments. In this example, the path module 204 receives vehicle data 155 and determines sensor data 157 that describe the surroundings between the vehicles. The path module 204 determines an NLOS path 605 that avoids the blocker 610 by using a building 615 as a reflector that reflects the beam off the building 615 to the second vehicle 123. The path module 204 determines whether the NLOS path 605 is predicted to be successful and, if the NLOS path 605 is predicted to be successful, determines to perform beam alignment based on the NLOS path 605.

As a result, the first vehicle 121 uses mmWave communication to communicate with the second vehicle 123. The mmWave communication may be used, for example, for the first vehicle 121 to communicate sensor data 157 to the second vehicle 123. This may be particularly advantageous in an environment with many buildings, heavy traffic, and traffic conditions that arise in real-time.

The beam alignment module 206 can be software including routines for performing beam alignment. In some embodiments, the beam alignment module 206 can be a set of instructions executable by the processor 125 which, when executed by the processor 125, cause the processor 125 to execute one or more of the steps of the method 700 described below with reference to FIG. 7 and/or the method 800 described below with reference to FIG. 8. In some embodiments, the beam alignment module 206 can be stored in the memory 127A of the computer system 200 and can be accessible and executable by the processor 125. The beam alignment module 206 may be adapted for cooperation and communication with the processor 125 and other components of the computer system 200 via signal line 226.

The beam alignment module 206 instructs the mmWave communication radio 147A to perform beam alignment and establish a communication link with the second vehicle 123. If the path module 204 determined that the NLOS path is predicted to succeed, the beam alignment module 206 uses the NLOS path included in the path data 159 to align the beams. If the path module 204 determined that the NLOS path is predicted to fail, the beam alignment module 206 may perform beam alignment between the first vehicle 121 and the second vehicle 123 based on a LOS path.

Once the communication link is established, the beam alignment module 206 instructs the mmWave communication radio 147A to transmit mmWave communications to the second vehicle 123.

In some embodiments, the beam alignment module 206 adapts a transmission scheme to further improve mmWave communications. For example, the beam alignment module 206 adapts a transmission scheme that includes modulation, error correction, and/or beam width adjustment based on a path length and a reflection loss of the beam when the beam is reflected. The transmission scheme may be based on sensor data 157 from the sensor set 150. For example, the beam alignment module 206 may receive sensor data 157 from radar that uses a special waveform, such as a frequency modulated continuous waveform, to determine information about the existence, location, and velocity of neighboring vehicles from reflections.

The user interface module 208 can be software including routines for generating graphical data for displaying a user interface. In some embodiments, the user interface module 208 can be stored in the memory 127A of the computer system 200 and can be accessible and executable by the processor 125. The user interface module 208 may be adapted for cooperation and communication with the processor 125 and other components of the computer system 200 via signal line 228.

In some embodiments, the user interface module 208 generates graphical data for displaying a user interface for a user, such as a driver of the first vehicle 121. The user interface module 208 may generate graphical data for displaying a user interface that provides the user with options for configuring aspects of the beam alignment application 199. For example, the user interface may include an option for associating the beam alignment application 199 with other applications, such as a map application, so that the beam alignment application 199 has access to journey data that describes a journey the driver is taking with the first vehicle 121. The journey data may become part of the vehicle data 155 used to determine the location of a vehicle in the future. In some embodiments the beam alignment application 199 includes other features, such as a map module that provides driving directions to the driver. In these embodiments, the user interface module 208 may generate graphical data for the other features, such as graphical data for displaying a user interface for inputting a destination with a request button for generating driving directions.

Example Methods

Figure 7:
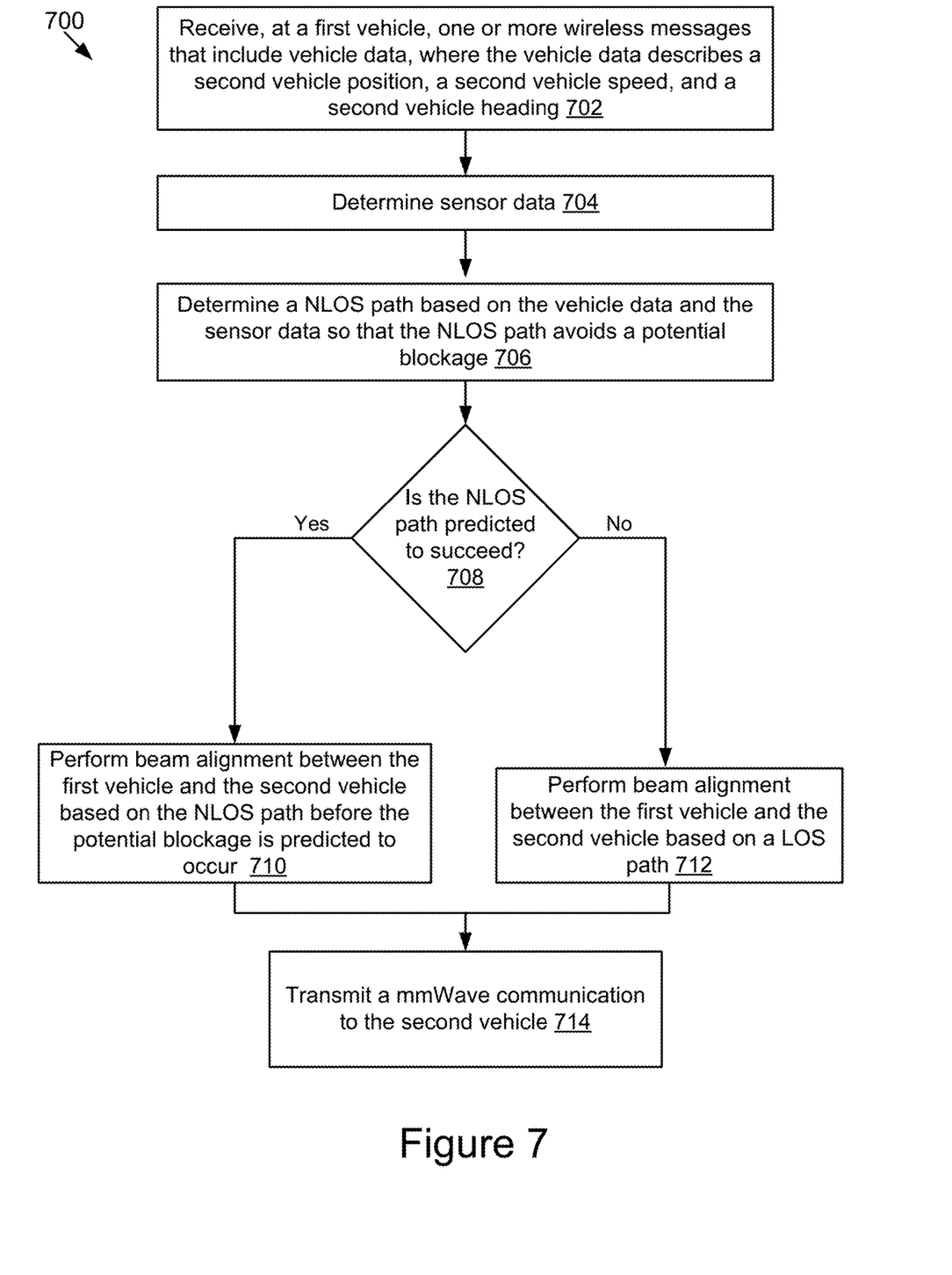
FIG. 7 is a flowchart of an example method for performing beam alignment between a first vehicle and a second vehicle according to some embodiments.

Referring now to FIG. 7, depicted is a method 700 for performing beam alignment between a first vehicle 121 and a second vehicle 123. One or more of the steps described herein for the method 700 may be executed by the beam alignment application 199 of FIG. 1 and/or the computer system 200 of FIG. 2.

At step 702, one or more wireless messages are received at a first vehicle 121 that include vehicle data 155, where the vehicle data 155 describes a vehicle position, a vehicle speed, and a vehicle heading. The wireless messages may be any combination of DSRC messages, such as a BSM message, LTE-X2X messages, or 802.11p messages. The wireless messages may be received from any combination of a first vehicle 121, an RSU 122, and a blocker.

At step 704, sensor data 157 is determined. The sensor data 157 may be determined from the sensor set 150 of the first vehicle 121 and/or a wireless message.

At step 706, a NLOS path is determined based on the vehicle data 155 and the sensor data 157 so that the NLOS path avoids a potential blockage. For example, the NLOS path includes a beam that is reflected off a reflector to avoid a blocker. At step 708, it is determined whether the NLOS path is predicted to succeed. For example, it is determined whether the NLOS path is predicted to succeed based on a beam transmission percentage satisfying a threshold percentage.

If the NLOS path is predicted to succeed, at step 710, beam alignment is performed between the first vehicle 121 and the second vehicle 123 based on the NLOS path before the potential blockage is predicted to occur. If the NLOS path is predicted to fail, at step 712, beam alignment is performed between the first vehicle and the second vehicle based on a LOS path. At step 714, a mmWave communication is transmitted to the second vehicle 123. For example, the mmWave communication radio 147A transmits the mmWave communication to transmit sensor data 157 to the second vehicle 123.

Figure 8:
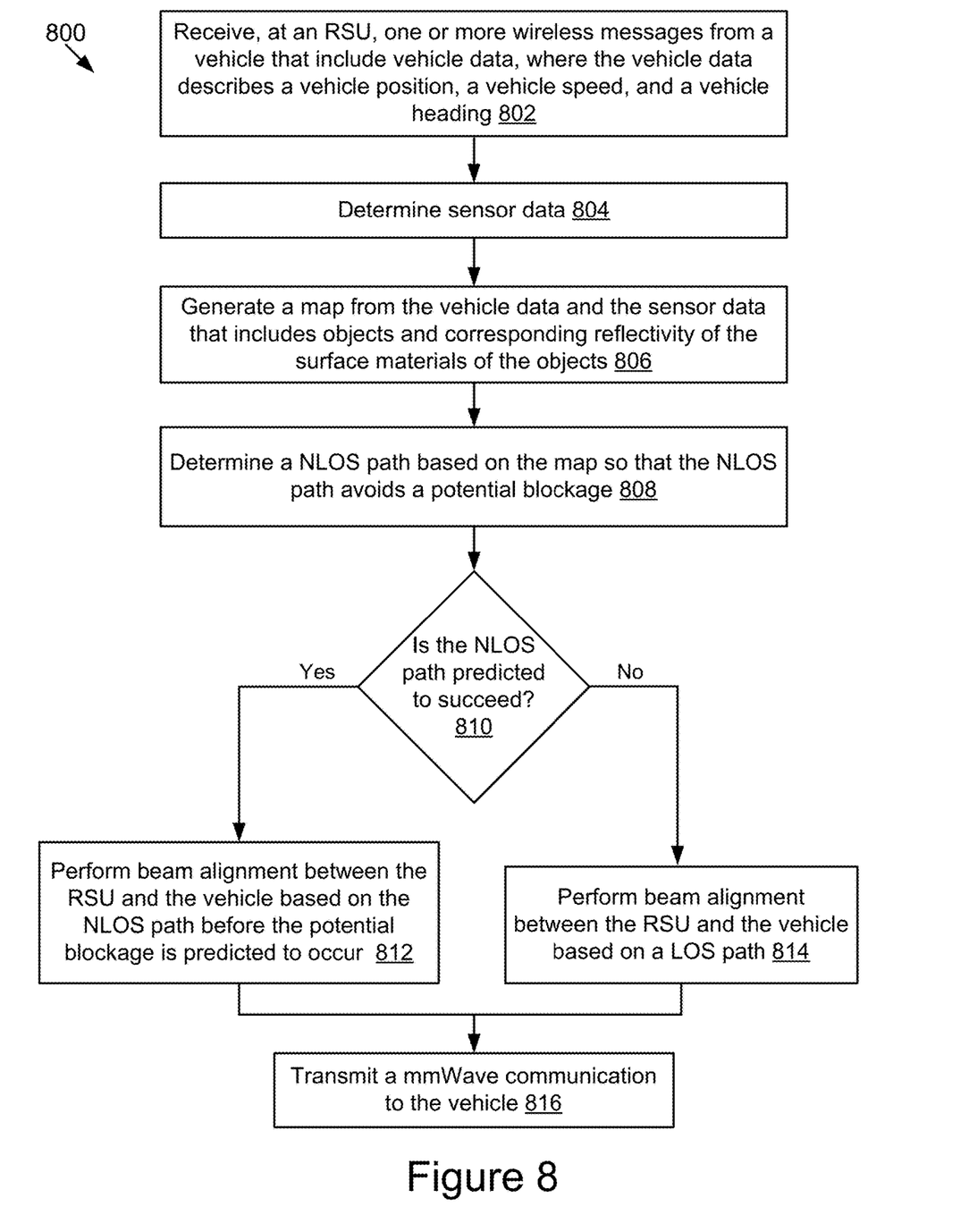
FIG. 8 is a flowchart of an example method for performing beam alignment between a roadside unit and a vehicle according to some embodiments.

Referring now to FIG. 8, depicted is an example method 800 for performing beam alignment between a roadside unit and a vehicle. One or more of the steps described herein for the method 800 may be executed by the beam alignment application 199 of FIG. 1 and/or the computer system 200 of FIG. 2.

At step 802, one or more wireless messages are received at a RSU 122 from a vehicle that include vehicular data 155, where the vehicle data describes a vehicle position, a vehicle speed, and a vehicle heading. At step 804, sensor data 157 is determined. The sensor data 157 may be based on a sensor set associated with the RSU, such as from cameras, radar, LIDAR, etc. The sensor data 157 may also be received as part of the wireless messages from vehicles.

At step 806, a map is generated from the vehicle data 155 and the sensor data 157 that includes objects and corresponding reflectivity of the surface materials of the objects. At step 808, a NLOS path is determined based on the map so that the NLOS path avoids a potential blockage. At step 810, it is determined whether the NLOS path is predicted to succeed. For example, the NLOS path is predicted to succeed based on a beam transmission percentage satisfying a threshold percentage and the threshold percentage corresponds to a transmission rate of LOS path.

If the NLOS path is predicted to succeed, at step 812, beam alignment is performed between the RSU 122 and the vehicle based on the NLOS path before the potential blockage is predicted to occur. If the NLOS path is predicted to fail, at step 814, beam alignment is performed between the RSU 122 and the vehicle based on a LOS path. At step 816, a mmWave communication is transmitted to the vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, at a first vehicle, one or more wireless messages that include vehicle data, wherein the vehicle data describes a second vehicle position, a second vehicle speed, and a second vehicle heading;
   determining a non-line of sight (NLOS) path between the first vehicle and the second vehicle based on the vehicle data so that the NLOS path avoids a potential blockage;

performing beam alignment between the first vehicle and the second vehicle based on the NLOS path before the potential blockage is predicted to occur; and transmitting a communication to the second vehicle using the NLOS path.

2. The method of claim 1, further comprising:

generating a map that identifies objects in an environment between the first vehicle and the second vehicle; and wherein determining the NLOS path includes performing ray tracing to determine the NLOS path between the first vehicle and the second vehicle.

3. The method of claim 2, wherein:

determining the NLOS path is further based on using sensor data;

the sensor data is used to identify the objects and surface materials of the objects as potential reflectors; and the NLOS path includes reflecting a beam off of a reflector to avoid a blocker that creates the potential blockage.

4. The method of claim 1, further comprising:

adapting a transmission scheme that includes at least one of modulation, error correction, and beam width adjustment based on a path length and a reflection loss of a beam when the beam is reflected.

5. The method of claim 1, further comprising:

responsive to the NLOS path being predicted to fail, performing beam alignment between the first vehicle and the second vehicle based on a line-of sight (LOS) path.

6. The method of claim 1, wherein the one or more wireless messages include at least one of a long-term evolution vehicle to everything (LTE-V2X) message and a 802.11p message.

7. The method of claim 1, wherein the one or more wireless messages are transmitted by at least one of the first vehicle, a blocker, and a roadside unit (RSU).

8. The method of claim 1, wherein:

the one or more wireless messages include a wireless message received from a blocker;

the vehicle data also describes a blocker position, a blocker speed, and a blocker heading; and determining whether the NLOS path is predicted to succeed is further based on the blocker position, the blocker speed, and the blocker heading.

9. The method of claim 1, wherein determining the NLOS path is further based on sensor data that is used to detect surrounding objects and surface materials of the surrounding objects as potential reflectors of a beam.

10. A system comprising:

an onboard vehicle computer system of a first vehicle that includes a non-transitory memory storing computer code which, when executed by the onboard vehicle computer system causes the onboard vehicle computer system to:

receive, at the first vehicle, one or more wireless messages that include vehicle data, wherein the vehicle data describes a second vehicle position, a second vehicle speed, and a second vehicle heading;

determine a non-line of sight (NLOS) path between the first vehicle and the second vehicle based on the vehicle data so that the NLOS path avoids a potential blockage;

perform beam alignment between the first vehicle and the second vehicle based on the NLOS path before the potential blockage is predicted to occur; and transmit a communication to the second vehicle using the NLOS path.

11. The system of claim 10, wherein the onboard vehicle computer system includes additional computer code that causes the onboard vehicle computer system to:

generate a map that identifies objects in an environment between the first vehicle and the second vehicle; and wherein determining the NLOS path includes performing ray tracing to determine the NLOS path between the first vehicle and the second vehicle.

12. The system of claim 11, wherein:

determining the NLOS path is further based on using sensor data;

the sensor data is used to identify the objects and surface materials of the objects as potential reflectors; and the NLOS path includes reflecting a beam off of a reflector to avoid a blocker that creates the potential blockage.

13. The system of claim 10, wherein the onboard vehicle computer system includes additional computer code that causes the onboard vehicle computer system to:

adapt a transmission scheme that includes at least one of modulation, error correction, and beam width adjustment based on a path length and a reflection loss of a beam when the beam is reflected.

14. The system of claim 10, wherein the onboard vehicle computer system includes additional computer code that causes the onboard vehicle computer system to:

responsive to the NLOS path being predicted to fail, performing beam alignment between the first vehicle and the second vehicle based on a line-of sight (LOS) path.

15. A non-transitory memory encoded with a computer program, the computer program comprising instructions that, when executed by one or more processors, cause the one or more processors to perform operations comprising:

receiving, at a roadside unit (RSU), one or more wireless messages from a vehicle that include vehicle data, where the vehicle data describes a vehicle position, a vehicle speed, and a vehicle heading;

determining a non-line of sight (NLOS) path between the RSU and the vehicle based on the vehicle data so that the NLOS path avoids a potential blockage; and performing beam alignment between the RSU and the vehicle based on the NLOS path before the potential blockage is predicted to occur.

16. The non-transitory memory of claim 15, further comprising determining whether the NLOS path is predicted to succeed based on a beam transmission percentage satisfying a threshold percentage and the threshold percentage corresponds to a transmission rate of a line-of sight (LOS) path.

17. The non-transitory memory of claim 16, wherein the NLOS path includes reflecting a beam off of a reflector to avoid a blocker that creates the potential blockage.

18. The non-transitory memory of claim 15, wherein determining the NLOS path includes performing ray tracing to determine the NLOS path between the RSU and the vehicle.

19. The non-transitory memory of claim 15, wherein the operations further comprise:

adapting a transmission scheme that includes at least one of modulation, error correction, and beam width adjustment based on a path length and a reflection loss of a beam when the beam is reflected.

20. The non-transitory memory of claim 15, wherein the operations further comprise:

responsive to the NLOS path being predicted to fail, performing beam alignment between the RSU and the vehicle based on a line-of sight (LOS) path.

* * * * *